(12) United States Patent
Kim

(10) Patent No.: US 7,535,882 B2
(45) Date of Patent: May 19, 2009

(54) RECEPTION IN DEDICATED SERVICE OF WIRELESS COMMUNICATION SYSTEM

(75) Inventor: Myeong-Cheol Kim, Aachen (DE)

(73) Assignee: LG Electronics, Inc., Seoul (KR)

( * ) Notice: Subject to any disclaimer, the term of this patent is extended or adjusted under 35 U.S.C. 154(b) by 316 days.

(21) Appl. No.: 11/203,023

(22) Filed: Aug. 11, 2005

(65) Prior Publication Data
US 2006/0034205 A1 Feb. 16, 2006

Related U.S. Application Data

(60) Provisional application No. 60/601,267, filed on Aug. 12, 2004.

(51) Int. Cl.
H04Q 7/00 (2006.01)
(52) U.S. Cl. ............ 370/338; 370/341; 370/329; 455/428; 455/560; 455/450
(58) Field of Classification Search ......... 370/328–348; 455/432.1, 432.2, 436–444, 509, 517, 560, 455/428
See application file for complete search history.

(56) References Cited

U.S. PATENT DOCUMENTS

| | | | |
|---|---|---|---|
| 6,697,651 B2 * | 2/2004 | Li | 455/574 |
| 7,082,305 B2 * | 7/2006 | Willars et al. | 455/441 |
| 7,200,670 B1 | 4/2007 | Hearn et al. | |
| 2002/0045451 A1 * | 4/2002 | Hwang et al. | 455/442 |
| 2002/0111166 A1 | 8/2002 | Monroe | |
| 2002/0183053 A1 * | 12/2002 | Gopalakrishna et al. | 455/423 |
| 2003/0119452 A1 * | 6/2003 | Kim et al. | 455/69 |
| 2004/0081192 A1 * | 4/2004 | Koulakiotis et al. | 370/432 |
| 2004/0085926 A1 * | 5/2004 | Hwang et al. | 370/328 |
| 2004/0202140 A1 * | 10/2004 | Kim et al. | 370/335 |
| 2005/0111395 A1 | 5/2005 | Hwang et al. | |
| 2005/0195852 A1 * | 9/2005 | Vayanos et al. | 370/437 |
| 2005/0213541 A1 * | 9/2005 | Jung et al. | 370/331 |
| 2005/0249140 A1 * | 11/2005 | Lee et al. | 370/312 |
| 2005/0272459 A1 * | 12/2005 | Lee et al. | 455/522 |
| 2006/0106865 A1 * | 5/2006 | Beming et al. | 707/104.1 |
| 2006/0146858 A1 * | 7/2006 | Kim | 370/432 |
| 2006/0258384 A1 * | 11/2006 | Edwin et al. | 455/503 |
| 2006/0268873 A1 | 11/2006 | Tonjes et al. | |
| 2008/0070584 A1 | 3/2008 | Kuo | |

* cited by examiner

Primary Examiner—Kamran Afshar
(74) Attorney, Agent, or Firm—Lee, Hong, Degerman, Kang & Waimey (57) ABSTRACT

The present invention is directed to receiving a point-to-multipoint service while receiving a dedicated service in a wireless communication system. A mobile terminal receives radio link configuration information from a network for establishing a radio link with a cell in order to receive the dedicated service. While receiving the radio link configuration information, the mobile terminal also receives directly from the network point-to-multipoint control channel and/or point-to-multipoint indication channel configuration information of the cell for receiving the point-to-multipoint service.

27 Claims, 9 Drawing Sheets

RECEPTION IN DEDICATED SERVICE OF WIRELESS COMMUNICATION SYSTEM

CROSS-REFERENCE TO RELATED APPLICATIONS

Pursuant to 35 U.S.C. § 119(e), this application claims the benefit of earlier filing date and right of priority to U.S. Provisional Application No. 60/601,267, filed on Aug. 12, 2004, the contents of which is hereby incorporated by reference herein in its entirety.

FIELD OF THE INVENTION

The present invention relates to receiving a point-to-multipoint service, and more particularly, to receiving a point-to-multipoint service while receiving a dedicated service in a wireless communication system.

BACKGROUND OF THE INVENTION

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

Figure 1:
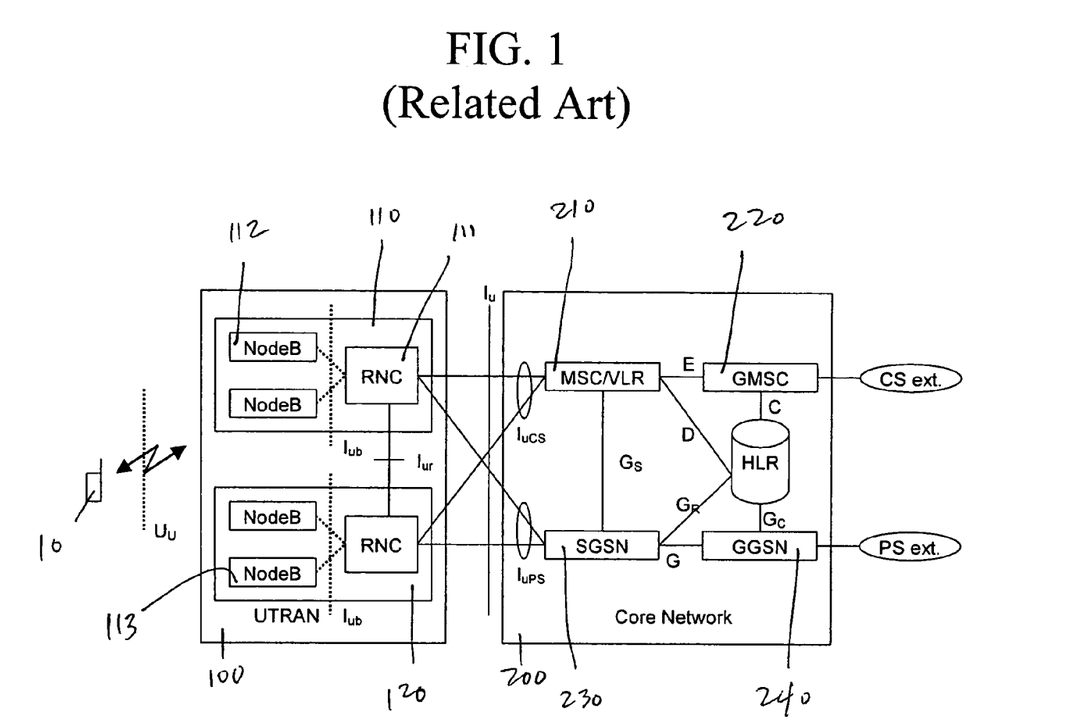
FIG. 1 is a block diagram of a general UMTS network architecture.

FIG. 1 illustrates an exemplary basic structure of a general UMTS network. As shown in FIG. 1, the UMTS is roughly divided into a mobile terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

Figure 2:
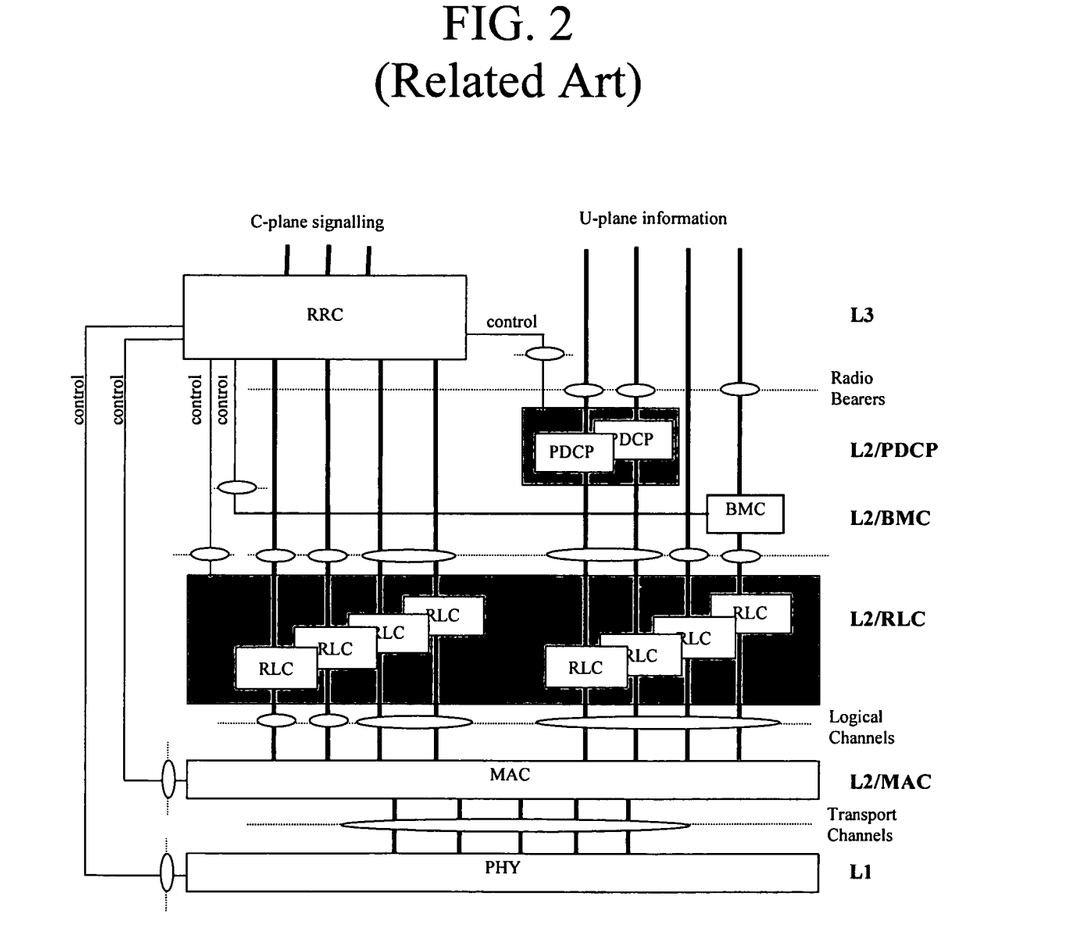
FIG. 2 is a block diagram of a structure of a radio interface protocol between a terminal and a network based on 3GPP radio access network standards.

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or "MBMS service") refers to a method of providing streaming or background services to a plurality of UEs using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

Figure 3:
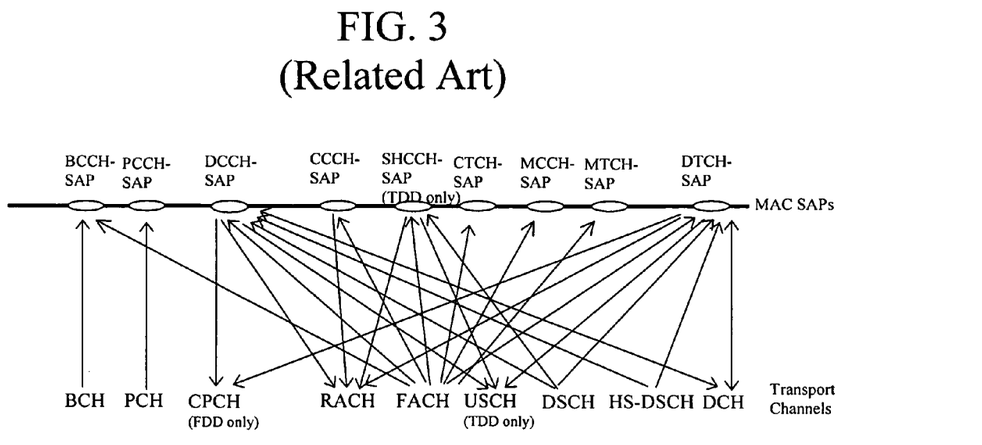
FIG. 3 illustrates the mapping of logical channels onto transport channels in the mobile terminal.
Figure 4:
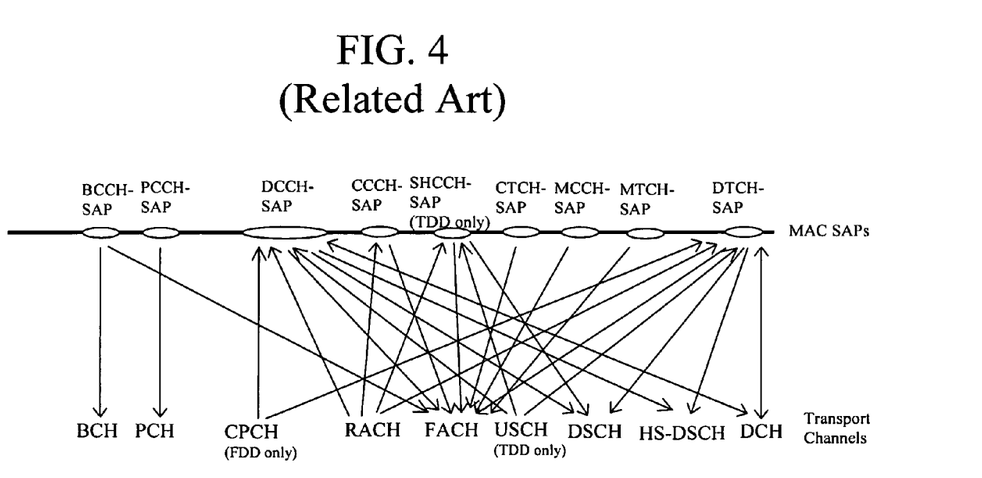
FIG. 4 illustrates the mapping of logical channels onto transport channels in the network.

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

Figure 5:
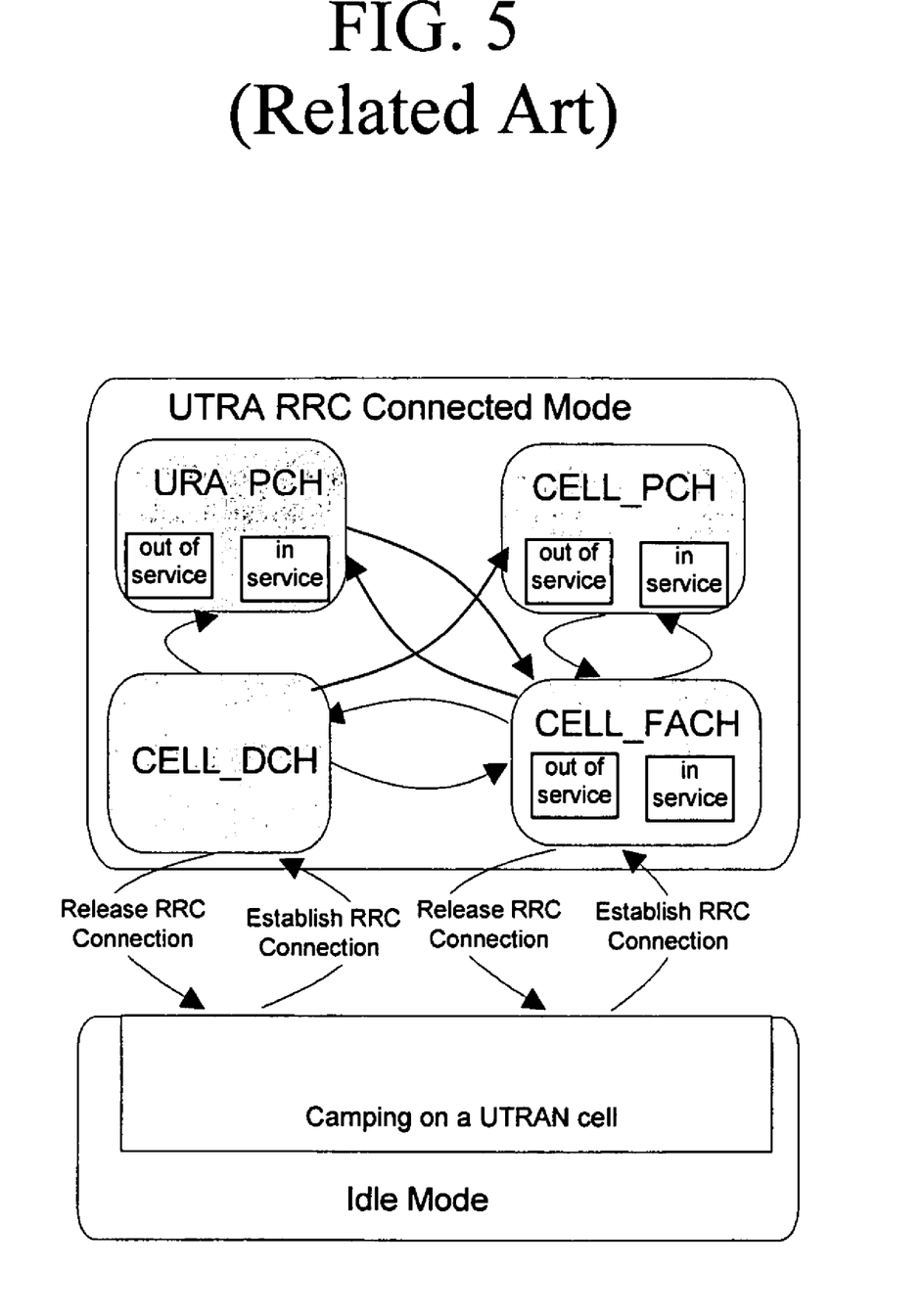
FIG. 5 illustrates possible transitions between modes and states in the UMTS network.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state. Depending on the states, the UE listens to different channels. For example a UE in CELL_DCH state will try to listen (amongst others) to DCH type of transport channels, which comprises DTCH and DCCH transport channels, and which can be mapped to a certain DPCH. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Generally, a UE in CELL_DCH state simultaneously exchanges data with different cells of NodeBs using a DPCCH (Dedicated Physical Control Channel). The different cells the UE is connected to, i.e., the cells to which the UE transmits to or receives from the DPCCH channel may belong to the same or different NodeBs. The different NodeBs may be connected to one RNC or to different RNCs. When a UE exchanges data with a cell in CELL_DCH state, the UE is said to have a radio link towards a cell. When the UE has radio links to several NodeBs, the UE is said to be in "soft handover". When the UE has radio links to several cells on the same NodeB, the UE is said to be in "softer handover". The set of all radio links the UE uses is called the "active set" of the UE. The UE may receive information on the neighboring cells via signaling messages to evaluate cell quality and report this information to the RNC. The RNC may then use this information to update the list of cells in the active set of the UE.

Main system information is sent on the BCCH logical channel, which is mapped on the P-CCPCH (Primary Common Control Physical Channel). Specific system information blocks can be sent on the FACH channel. When the system information is sent on the FACH, the UE receives the configuration of the FACH either on the BCCH that is received on the P-CCPCH or on a dedicated channel. The P-CCPCH is sent using the same scrambling code as a P-CPICH (Primary Common Pilot Channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor, the number of orthogonal codes is equal to the length of the code. For each spreading factor, the given set of orthogonal codes, as specified in the UMTS system, are numbered from 0 to SF-1. Each code can thus be identified by giving its length (i.e. spreading factor) and the number of the code. The spreading code that is used by the P-CCPCH is always of a fixed spreading factor 256 and the number is the number 1. The UE knows about the primary scrambling code either by information sent from the network on system information of neighboring cells that the UE has read, by messages that the UE has received on the DCCH channel, or by searching for the P-CPICH, which is sent using the fixed SF 256 and the spreading code number 0, and which transmits a fixed pattern.

The system information comprises information on neighboring cells, configuration of the RACH and FACH transport channels, and the configuration of MCCH, which is a channel dedicated for MBMS service. When the UE has selected a cell (in CELL_FACH, CELL_PCH or URA_PCH state), the UE verifies that it has valid system information.

The system information is organized in SIBs (system information blocks), a MIB (Master information block) and scheduling blocks. The MIB is sent very frequently and provides timing information of the scheduling blocks and the different SIBs. For SIBs that are linked to a value tag, the MIB also contains information on the last version of a part of the SIBs. SIBs that are not linked to a value tag are linked to an expiration timer. The SIBs linked to an expiration timer become invalid and need to be reread if the time of the last reading of the SIB is larger than an expiration timer value. The SIBs linked to a value tag are only valid if they have the same value tag as a value tag broadcast in the MIB. Each block has an area scope of validity, such as a Cell, a PLMN (Public Land Mobile Network) or an equivalent PLMN, which signifies on which cells the SIB is valid. A SIB with the area scope "Cell" is valid only for the cell in which it has been read. A SIB with the area scope "PLMN" is valid in the whole PLMN. A SIB with the area scope "equivalent PLMN" is valid in the whole PLMN and equivalent PLMN.

In general, UEs read the system information when they are in idle mode, CELL_FACH state, CELL_PCH state or in URA_PCH state of the cell that they have selected, i.e., the cell that they are camping on. In the system information, the UEs receive information on the neighboring cells on the same frequency, different frequencies and different RAT (Radio access technologies). This allows the UEs to know which cells are candidates for cell reselection.

In CELL_DCH state, the UE already listens to different radio links the UE is using. Accordingly, it increases complexity for the UE to additionally read BCCH channels. Therefore, the UE generally receives information on neighboring cells in a dedicated message from the RNC, and only for some very specific functions. However, it is possible that UEs read system information sent on the P-CCPCH channel or other transport channels while in CELL_DCH state.

The 3GPP system can provide multimedia broadcast multicast service (MBMS). The 3GPP TSG SA (Service and System Aspect) defines various network elements and their functions required for supporting MBMS services. A cell broadcast service provided by the prior art is limited to a service in which text type short messages are broadcast to a certain area. The MBMS service, however, is a more advanced service that multicasts multimedia data to terminals (UEs) that have subscribed to the corresponding service in addition to broadcasting multimedia data.

The MBMS service is a downward-dedicated service that provides a streaming or background service to a plurality of terminals by using a common or dedicated downward channel. The MBMS service is divided into a broadcast mode and a multicast mode. The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

Figure 6:
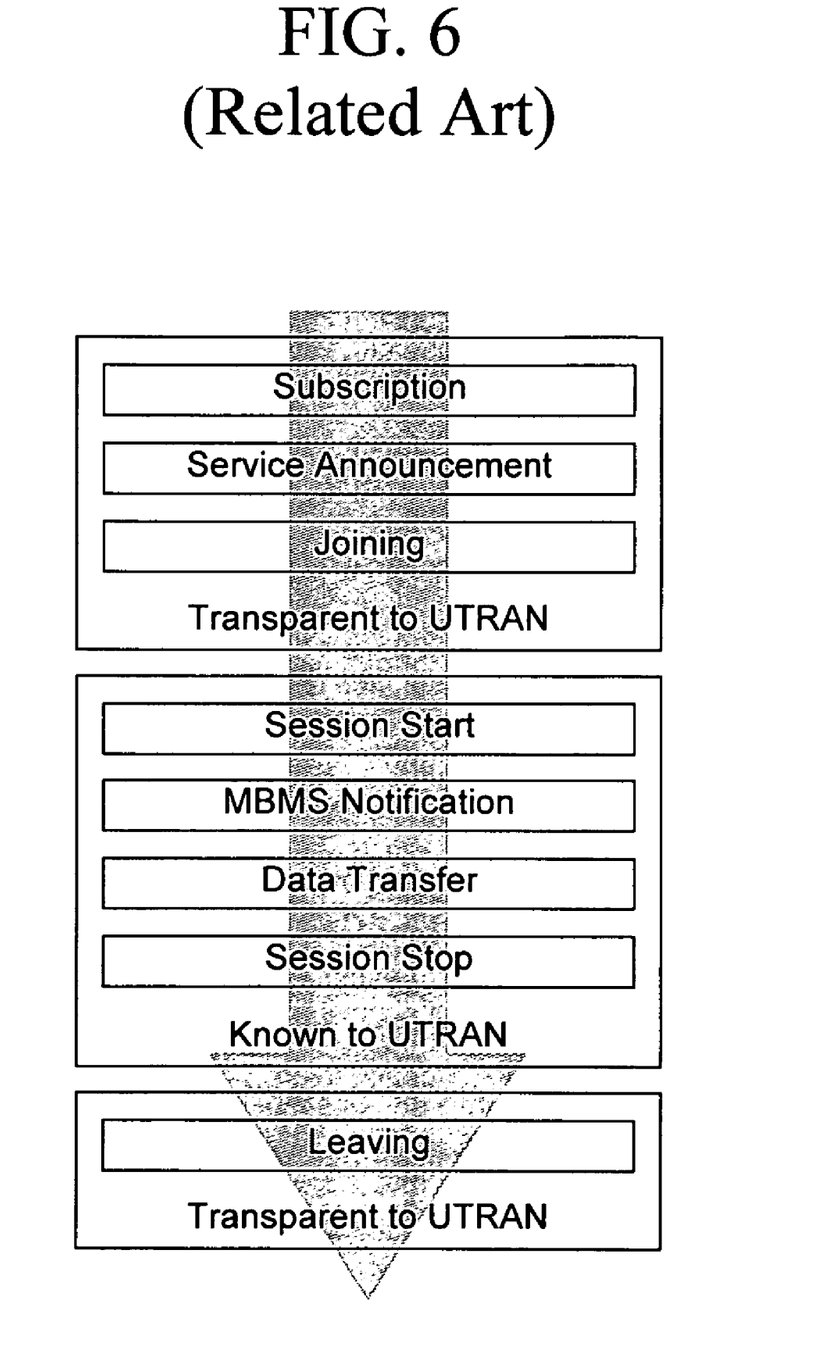
FIG. 6 illustrates a process of providing a particular point-to-multipoint service using a multicast mode.

FIG. 6 illustrates a process of providing a particular MBMS service, by using the multicast mode. The procedure can be split into two types of actions, those that are transparent and those that are not transparent to the UTRAN.

The transparent actions are described in the following. A user desiring to receive the MBMS service, first needs to subscribe in order to be allowed to receive MBMS services, to receive information on MBMS services, and to join a certain set of MBMS services. A service announcement provides the terminal with a list of services to be provided and other related information. The user can then join these services. By joining, the user indicates that the user wants to receive information linked to services that the user has subscribed to and becomes part of a multicast service group. When a user is no longer interested in a given MBMS service, the user leaves the service, i.e., the user is no longer part of the multicast service group. These actions can be taken by using any means of communication, i.e., the actions may be done using SMS (Short Messaging Service), or by Internet access. These actions do not have to necessarily be done using the UMTS system.

In order to receive a service for which the user is in a multicast group the following actions that are not transparent to the UTRAN are executed. The SGSN informs the RNC about a session start. Then the RNC notifies the UEs of the multicast group that a given service has started in order to initiate reception of the given service. After having broadcast the necessary UE actions and eventually the configuration of the PtM bearers for the given service the transmission of the data starts. When the session stops, the SGSN indicates the stopped session to the RNC. The RNC in turn initiates a session stop. The transmission of the service from the SGSN means for the RNC to provide a bearer service for conveying the data of the MBMS service.

After the notification procedure, other procedures can be initiated between the UE and the RNC and the SGSN to enable data transmission, such as RRC connection establishment, connection establishment towards the PS domain, frequency layer convergence, and counting.

Reception of an MBMS service may be performed in parallel to the reception of other services, such as a voice or video call on the CS domain, SMS transfer on the CS or PS domain, data transfer on the PS domain, or any signaling related to the UTRAN or PS or CS domain.

Figure 7:
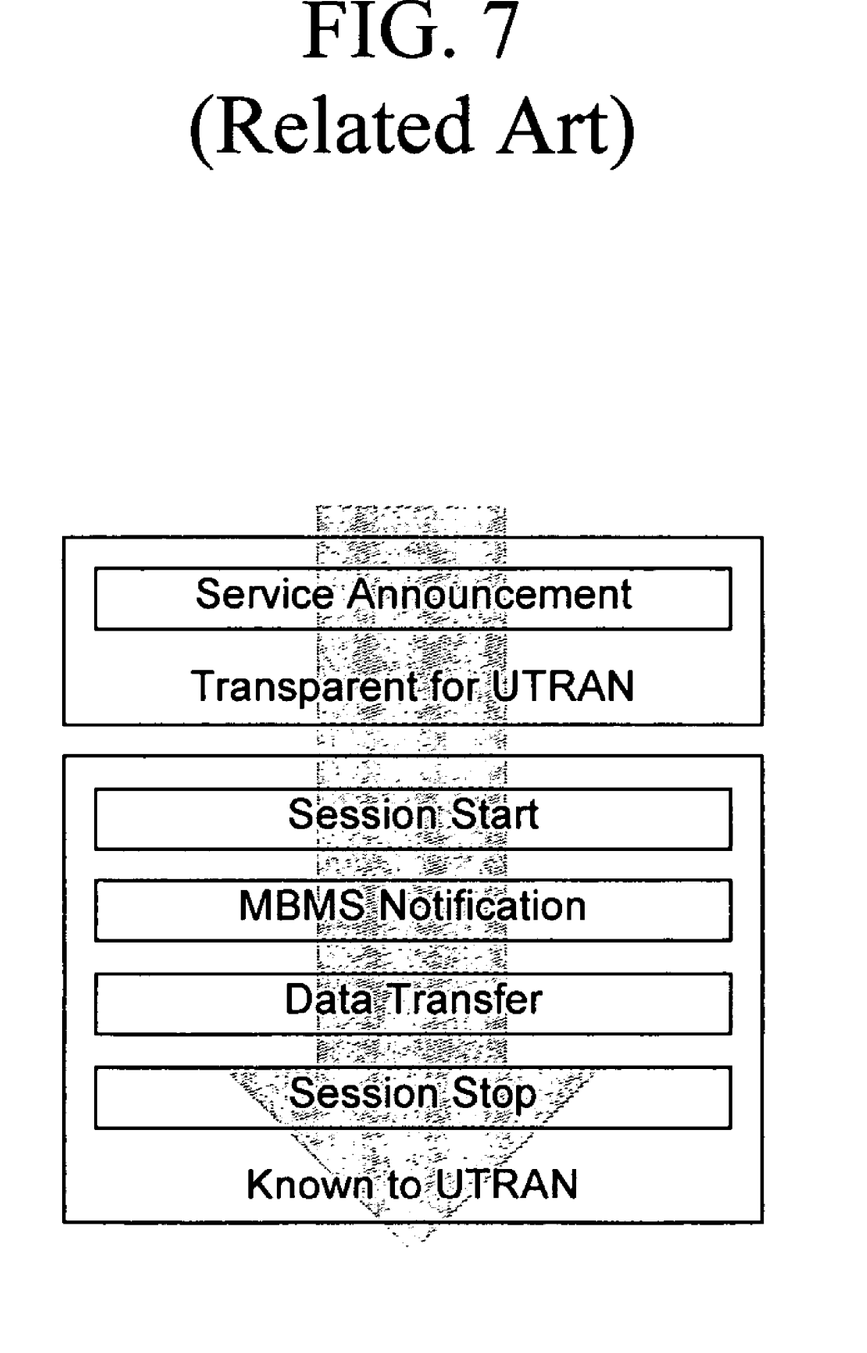
FIG. 7 illustrates a process of providing broadcast services.

Contrary to the multicast service, for broadcast services, as shown in FIG. 7, only the announcement of the service must be done in a transparent manner. No subscription or joining is needed. Afterwards, the actions that are transparent to the RNC are the same as for multicast services.

Figure 8:
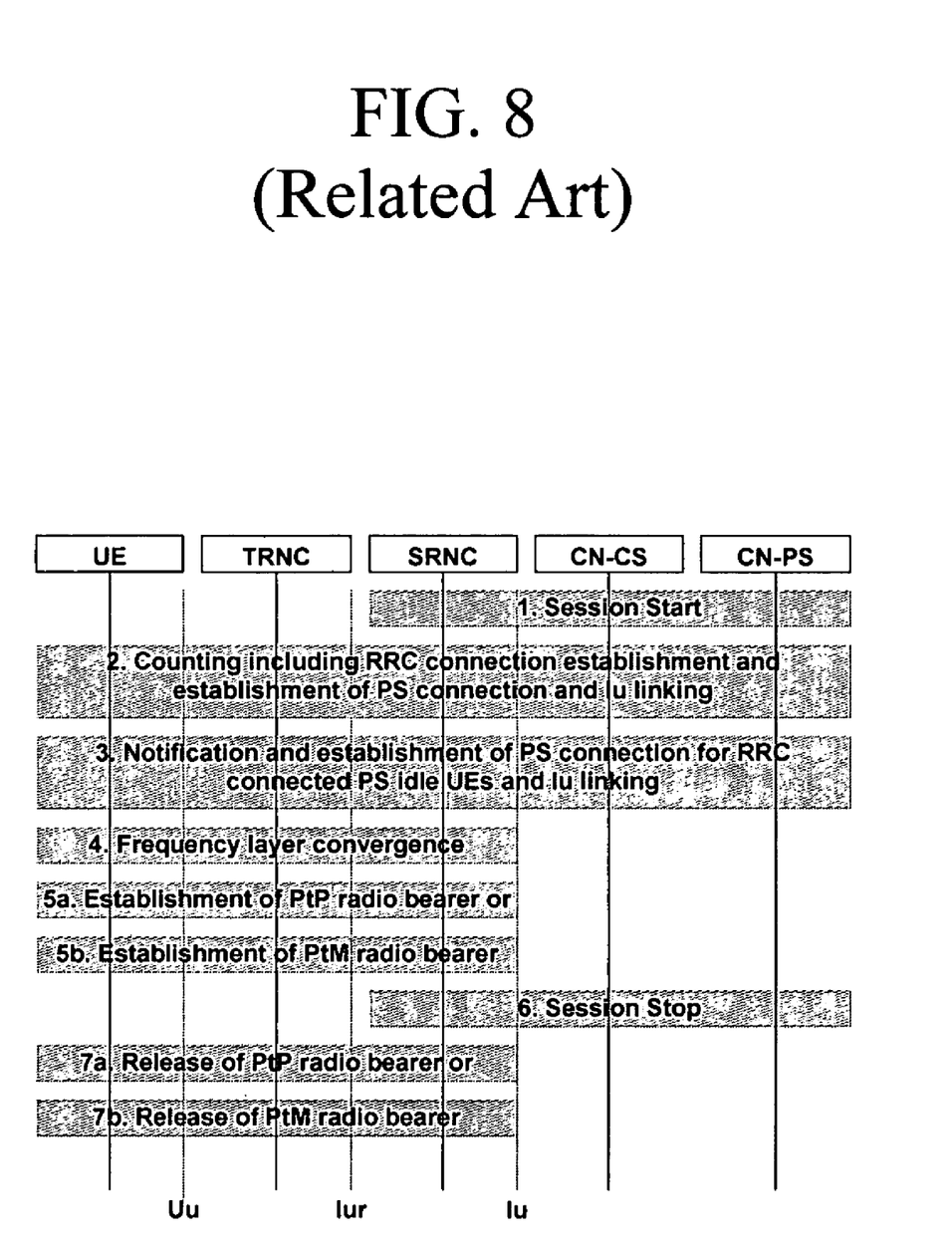
FIG. 8 illustrates a session sequence from a network perspective.

Referring to FIG. 8, a typical session sequence from a UTRAN perspective is illustrated. As shown, the SGSN informs the RNC about a session start (step 1). The RNC may then perform a counting procedure, which triggers some UEs to establish a connection to the PS domain (step 2). Consequently, the establishment of an RRC connection for the UEs is initiated. This allows the RNC to estimate the number of UEs in a given cell that are interested in the service. When the UE has established the PS connection, the SGSN initiates the Iu linking procedure, which provides the list of multicast services the UE has joined to the RNC.

For UEs that have an RRC connection established, and which are interested in the given MBMS service but are not connected to the PS domain, the RNC sends a specific message to the UEs triggering them to establish a PS connection (step 3). When the UE has established the PS connection, the SGSN initiates the Iu linking procedure, which provides the list of multicast services the UE has joined to the RNC. For UEs that are not in a CELL_DCH state, a frequency layer convergence scheme allows the RNC to trigger the UEs to change the frequency to which they listen (step 4).

Depending on the Radio Resource Management (RRM) scheme, the RNC establishes point-to-multipoint (PtM) or point-to-point (PtP) radio bearers for delivering the MBMS service (step 5a or 5b). The RNC delivers data received from the SGSN to the UEs that are part of the multicast group. After the transmission of the data, the SGSN informs the RNC about the end of the sessions (step 6). The RNC then releases the PtP or PtM radio bearers used for transmitting the MBMS data (step 7a or 7b).

Generally, for UEs in an RRC connected state, two possibilities exist. The UE will either have a connection established with the PS domain (PMM connected) or the UE will have no connection established with the PS domain (PMM idle mode). When there is no connection established with the PS domain, the UE will normally have a connection with the CS domain. Otherwise, the UE is not in an RRC connected mode.

For MBMS, two additional control channels are introduced. They are the MCCH and the MICH (MBMS Notification Indicator Channel). As explained above, the MCCH is mapped on the FACH. The MICH is a new physical channel and is used to notify users to read the MCCH channel. The MICH is designed to allow the UEs to perform a DRX (Discontinuous Reception) scheme. DRX allows the reduction of battery consumption for UEs while allowing the UEs to still be aware of any service for which a session is starting. The MICH may be used to inform the UE of a change in a frequency convergence scheme, change of a configuration of a point-to-multipoint (PtM) bearer, switch between the PtM bearer and a point-to-point (PtP) bearer, etc., which all require the MCCH to be read.

The MCCH channel periodically transmits information regarding active services, MTCH configuration, frequency convergence, etc. The UE reads the MCCH information to receive the subscribed services based on different triggers. For example, the UE may be triggered after cell selection/reselection, when the UE is notified of a given service on the MICH, or when the UE is notified via the DCCH channel. The configuration of the MCCH channel is broadcast in the system information. The MICH configuration (i.e. spreading code, scrambling code, spreading factor and other information) is either fixed in the standard, given in the system information or broadcast on the MCCH.

Figure 9:
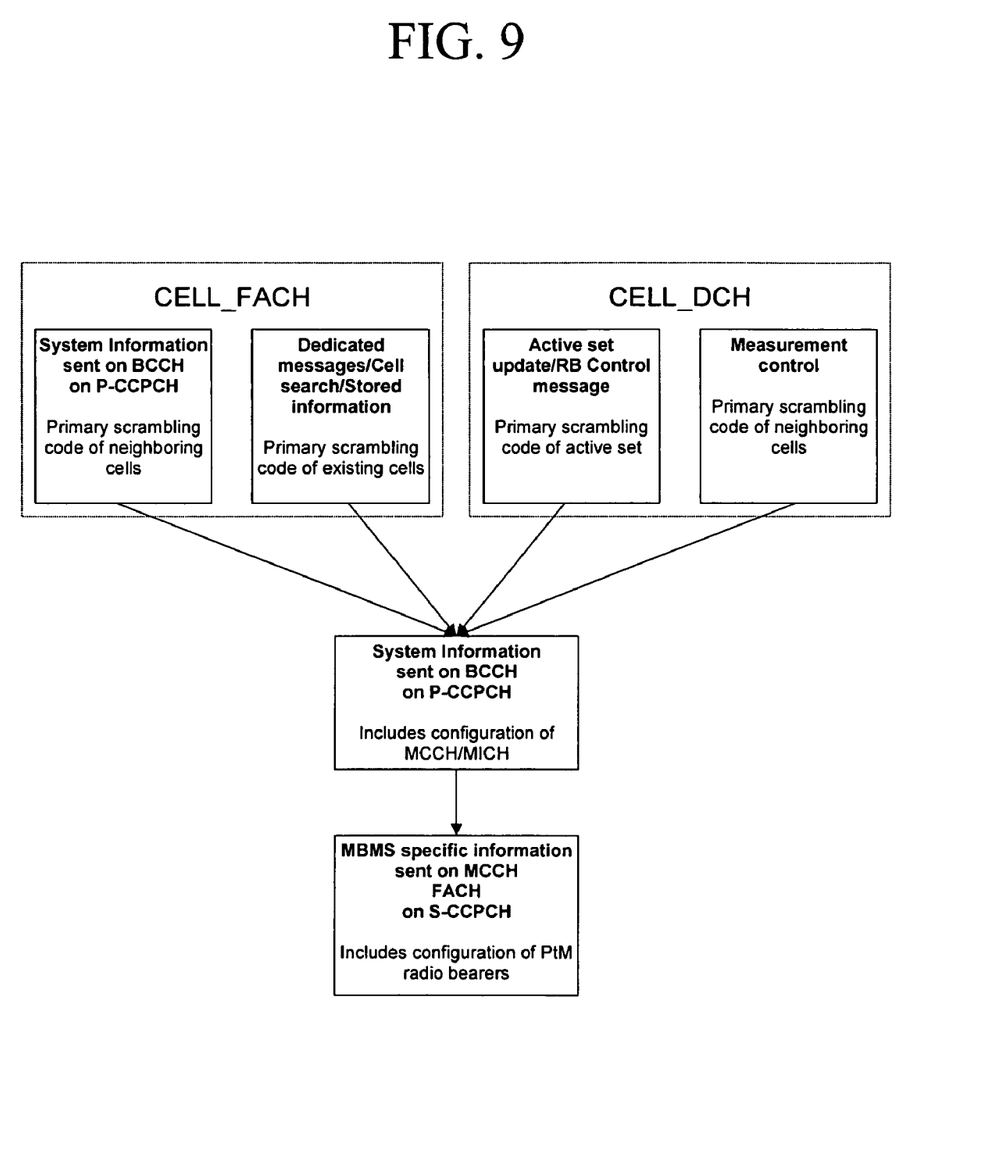
FIG. 9 illustrates a method for receiving point-to-multipoint radio bearer configuration information.

Referring to FIG. 9, a method for receiving point-to-multipoint (PtM) radio bearer configuration information in a mobile terminal is illustrated. When a UE in CELL_FACH state wants to receive a PtM radio bearer, the UE must first receive the system information on the BCCH channel, which is sent on the P-CCPCH channel, to obtain the MCCH configuration of the cell the UE has selected. Therefore, the UE must know the primary scrambling code as mentioned above. Once the UE knows the MCCH channel configuration, the UE then reads the MCCH channel to obtain the configuration information of the PtM radio bearers.

To obtain a first starting cell, the UE may receive the primary scrambling code of the cell by dedicated messages. The UE may also perform a cell search or read stored information. Alternatively, for a UE that has already selected or camped on a cell, the UE may use information regarding neighboring cells found in the system information of the cell the UE has already selected.

A UE in CELL_DCH state is generally also able to receive MBMS services broadcast on PtM radio bearers. To do this, the UE in CELL_DCH state must listen to the MCCH and/or MICH channel to be able to receive information regarding the PtM services that are provided.

Specifically, a UE in CELL_DCH state that wants to receive MBMS services on a PtM radio bearer may do the following. The UE may select a cell of the active set or the cells provided in measurement information received via a Measurement Control Message and listen to the BCCH to receive the system information containing the MCCH and/or MICH configuration. In case the UE is notfied about the start of a service by a dedicated message, the UE may delay reading the BCCH until after the notification has ended.

The UE may also listen to the MICH channel to know when a given service starts. Alternatively, the UE may receive a message from the RNC informing the UE that a given service has started. The UE may also listen to the MCCH channel to detect whether a service has started.

If not already previously done above, the UE may select a cell for receiving the MCCH and listen to the BCCH to receive the system information containing the MCCH and/or MICH configuration.

The UE may then receive relevant information regarding the PtM radio bearer configuration and eventually relevant information about the neighboring cells. Afterward, the UE starts receiving the service on the PtM radio bearer of the selected cell and eventually on the neighboring cells.

The active set of a UE in CELL_DCH state that is receiving a service on a PtM bearer is changed by the RNC to always maintain the best radio links in the active set. Each time the RNC adds a new neighboring cell to the active set of the UE, the UE may do the following. The UE may receive information regarding the BCCH of the newly added cell to receive the MCCH and MICH configurations of the newly added cell, if the cell is used for receiving MBMS service. The UE may also receive the MCCH to know about the MBMS configuration in the target cell.

When the UE is in CELL_DCH state and wants to listen to an MBMS service, the UE must listen to the BCCH to receive the MCCH and/or MICH configuration information to be able to know the configuration of the PtM radio bearers provided. However, this increases the complexity of the UE as well as the delay during cell changes.

SUMMARY OF THE INVENTION

The present invention is directed to receiving a point-to-multipoint service while receiving a dedicated service in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving a point-to-multipoint service while receiving a dedicated service in a wireless communication system, the method comprising receiving radio link configuration information from a network for establishing a radio link with a cell to receive the dedicated service and receiving with the radio link configuration information at least one of point-to-multipoint control channel configuration information and point-to-multipoint indication channel configuration information of the cell for receiving the point-to-multipoint service.

The method further comprises receiving with the radio link configuration information at least one of point-to-multipoint control channel configuration information and point-to-multipoint indication channel configuration information of at least one neighboring cell of the cell. The method further comprises adding the cell to a list of cells in an active set of a mobile terminal when the radio link is established.

In one aspect of the invention, the point-to-multipoint service is an MBMS service. Preferably, the point-to-multipoint control channel is an MBMS control channel (MCCH) and the point-to-multipoint indication channel is an MBMS indication channel (MICH).

In another aspect of the invention, the at least one of point-to-multipoint control channel configuration information and point-to-multipoint indication channel configuration information is received in at least one of an Active Set Update message, a Cell Update Confirm message, a Physical Channel Configuration message, a Transport Channel Configuration message, a Radio Bearer Reconfiguration message, a Radio Bearer Setup message, a RRC Connection Setup message, a Handover To UTRAN message, and a Measurement Control message. Preferably, the at least one of the messages is transmitted via dedicated channel, wherein the dedicated channel is a dedicated control channel (DCCH).

In a further aspect of the invention, the at least one of point-to-multipoint control channel configuration information and point-to-multipoint indication channel configuration information of the cell is received from a radio network controller (RNC) of the network.

Also, the at least one of point-to-multipoint control channel configuration information and point-to-multipoint indication channel configuration information of at least one neighboring cell of the cell is received from a radio network controller (RNC) of the network.

In another embodiment of the present invention, a method for transmitting a point-to-multipoint service to a mobile terminal receiving a dedicated service in a wireless communication system comprises transmitting radio link configuration information to the mobile terminal for establishing a radio link between the mobile terminal and a cell to transmit the dedicated service, and transmitting with the radio link configuration information at least one of point-to-multipoint control channel configuration information and point-to-multipoint indication channel configuration information the cell for transmitting the point-to-multipoint service.

The method further comprises transmitting with the radio link configuration information at least one of point-to-multipoint control channel configuration information and point-to-multipoint indication channel configuration information of at least one neighboring cell of the cell. The method further comprises monitoring the addition of the cell to a list of cells in an active set of the mobile terminal when the radio link is established.

In one aspect of the invention, the method further comprises sending a radio link addition/setup request message from a serving radio network controller (SRNC) to a drift radio network controller (DRNC) of the cell for requesting the setup of the radio link and sending a radio link addition/setup complete message from the DRNC to the SRNC for acknowledging the setup of the radio link.

Preferably, the radio link addition/setup request message comprises a request for including the at least one of point-to-multipoint control channel configuration information and point-to-multipoint indication channel configuration information of the cell in the radio link addition/setup complete message.

Preferably, the radio link addition/setup complete message comprises at least one of the at least one of point-to-multipoint control channel configuration information and point-to-multipoint indication channel configuration information of the cell and at least one of point-to-multipoint control channel configuration information and point-to-multipoint indication channel configuration information of at least one neighboring cell of the cell.

In another aspect of the invention, the point-to-multipoint service is an MBMS service. The point-to-multipoint control channel is an MBMS control channel (MCCH) and the point-to-multipoint indication channel is an MBMS indication channel (MICH).

In a further aspect of the invention, the at least one of point-to-multipoint control channel configuration information and point-to-multipoint indication channel configuration information is transmitted in at least one of an Active Set Update message, a Cell Update Confirm message, a Physical Channel Configuration message, a Transport Channel Configuration message, a Radio Bearer Reconfiguration message, a Radio Bearer Setup message, a RRC Connection Setup message, a Handover To UTRAN message, and a Measurement Control message.

Preferably, the at least one of point-to-multipoint control channel configuration information and point-to-multipoint indication channel configuration information of the cell is transmitted from a serving radio network controller (SRNC).

Also, the at least one of point-to-multipoint control channel configuration information and point-to-multipoint indication channel configuration information of at least one neighboring cell of the cell is transmitted from a serving radio network controller (SRNC).

In another embodiment of the present invention, a mobile terminal for receiving a point-to-multipoint service while receiving a dedicated service in a wireless communication system comprises means for receiving radio link configuration information from a network for establishing a radio link with a cell to receive the dedicated service and means for receiving with the radio link configuration information at least one of point-to-multipoint control channel configuration information and point-to-multipoint indication channel configuration information of the cell for receiving the point-to-multipoint service.

The mobile terminal further comprises means for receiving with the radio link configuration information at least one of point-to-multipoint control channel configuration information and point-to-multipoint indication channel configuration information of at least one neighboring cell of the cell. The mobile terminal further comprises adding the cell to a list of cells in an active set of the mobile terminal when the radio link is established.

In one aspect of the invention, the point-to-multipoint service is an MBMS service. The point-to-multipoint control channel is an MBMS control channel (MCCH) and the point-to-multipoint indication channel is an MBMS indication channel (MICH).

In another aspect of the invention, the at least one of point-to-multipoint control channel configuration information and point-to-multipoint indication channel configuration information is received in at least one of an Active Set Update message, a Cell Update Confirm message, a Physical Channel Configuration message, a Transport Channel Configuration message, a Radio Bearer Reconfiguration message, a Radio Bearer Setup message, a RRC Connection Setup message, a Handover To UTRAN message, and a Measurement Control message.

In a further aspect of the invention, the at least one of point-to-multipoint control channel configuration information and point-to-multipoint indication channel configuration information of the cell is received from a radio network controller (RNC) of the network.

Also, the at least one of point-to-multipoint control channel configuration information and point-to-multipoint indication channel configuration information of at least one neighboring cell of the cell is received from a radio network controller (RNC) of the network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to receiving a point-to-multipoint service while receiving a dedicated service in a wireless communication system.

When a mobile terminal (UE) moves from any state to a CELL_DCH state, or when an active set of the UE is changed, the UE receives information regarding the configuration of the radio links of the active set. When this information is transmitted in a message to the UE, MCCH/MICH configuration information may be included in the same message. Preferably, the message is transmitted via dedicated channel. Preferably, instead of the UE receiving the MCCH/MICH configuration information via the BCCH, the information is transmitted directly to the UE from a network.

For an RNC of the network to be able to send this information to the UE, the RNC must be aware of the configuration of neighboring cells. Accordingly, the RNC knows the MCCH/MICH configuration information of all cells of the active set of the UE and of the neighboring cells.

Referring to FIG. 1, RNCs may be connected via an Iur interface. This allows the UE to have in its active set radio links from two different RNCs. Accordingly, the UE that has started an RRC connection in one cell can seamlessly move into an area covered by cells handled by another RNC. In this case, a connection to the core network is done via the RNC where the UE started the RRC connection. This RNC is referred to as the SRNC (Serving RNC). The RNC that handles the radio links of the UE that are accessed via the Iur interface is referred to as the DRNC (Drift RNC).

Figure 10:
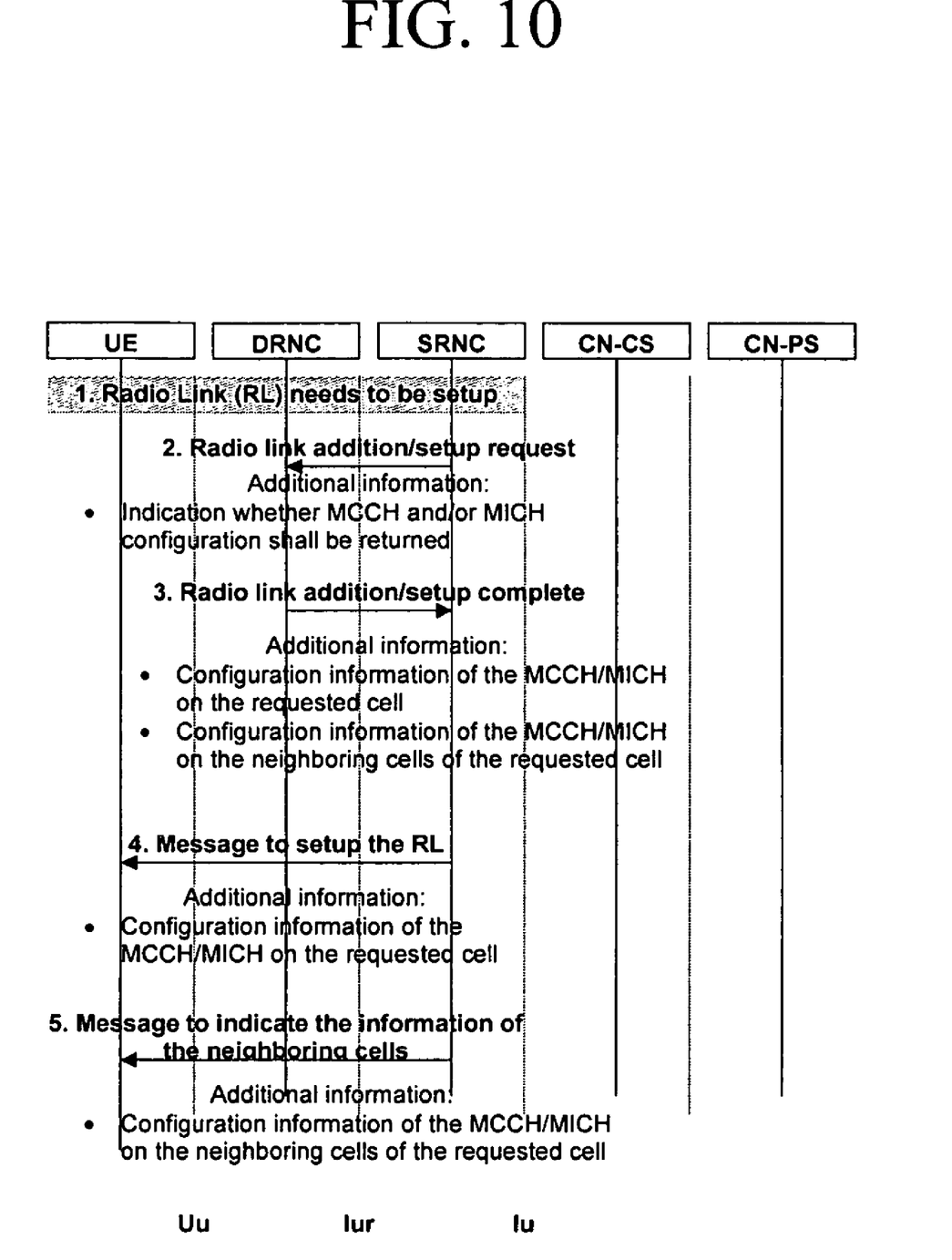
FIG. 10 illustrates a method for establishing a radio link in accordance with one embodiment of the present invention.

Referring to FIG. 10, a method for allowing a mobile terminal to receive a point-to-multipoint service on a point-to-multipoint radio bearer while receiving a dedicated service in accordance with one embodiment of the present invention is illustrated.

As shown in FIG. 10, an RNC initiates establishment of a new radio link of a cell to provide service to a UE in CELL_DCH state (step 1). Reasons for the establishment of the new radio link may be as follows: 1) a new RRC connection is established; 2) the UE is in handover from a GSM/GPRS system to a UMTS system; 3) the UE is in inter/intra frequency hard handover, i.e., all active set cells are removed and new cells are added, wherein the new cells are either on the same or another frequency as the removed cells; and 4) a new radio link is added for a UE that is already in CELL_DCH state.

If the radio link to be added is controlled by another RNC, then a serving RNC (SRNC) sends a "Radio Link Setup Request" or "Radio Link Addition" message to a drift RNC (DRNC) of the cell to request setup of the radio link and give information regarding the type of radio link needed (step 2). In addition, the SRNC may include information for informing the DRNC whether MCCH and/or MICH configuration information of the cell is to be included in a "Radio Link Setup Complete" or "Radio Link Addition Complete" message from the DRNC.

The DRNC answers with the "Radio Link Setup Complete" message or "Radio Link Addition Complete" and includes information about the characteristics of the radio link just setup (step 3). In addition, the DRNC may include in the message to the SRNC, information regarding the MCCH and/or MICH configuration of the radio link of the cell and information regarding the MCCH and/or MICH configuration of neighboring cells of the cell.

The SRNC then sends a message to the UE to indicate the new radio link (step 4). In addition, the SRNC may include in the message to the UE the information regarding the MCCH and/or MICH configuration of the newly added radio link. Possible messages, where the MCCH and/or MICH configuration information of the newly added radio link can be transmitted are: Active Set Update, Cell Update Confirm, Physical Channel Reconfiguration, Transport Channel Reconfiguration, Radio Bearer Reconfiguration, Radio Bearer Setup, Radio Bearer Release, RRC Connection Setup and Handover To UTRAN.

Afterward, the SRNC sends to the UE a message indicating the information of the neighboring cells of the cell (step 5). In addition to the already existing information elements (IEs) in this message, the SRNC may transmit to the UE a Measurement Control message containing the MCCH and/or MICH configuration information of the neighboring cells of the newly added radio link.

Therefore, in accordance with the present invention, it is now easier for a mobile terminal to receive a point-to-multipoint service on a point-to-multipoint radio bearer while receiving a dedicated service.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving a point-to-multipoint service while receiving a dedicated service in a wireless communication system, the method comprising:
    receiving radio link configuration information from a network for establishing a radio link with a cell to receive the dedicated service; and
    receiving with the radio link configuration information at least one of point-to-multipoint control channel configuration information and point-to-multipoint indication channel configuration information of the cell for receiving the point-to-multipoint service;
    receiving a radio link addition/setup request message in a drift radio network controller (DRNC) of the cell from a serving radio network controller (SRNC) for requesting the setup of the radio link; and
    receiving a radio link addition/setup complete message in the SRNC from the DRNC for acknowledging the setup of the radio link,
    wherein a point-to-multipoint control channel is used to transmit control information of the point-to-multipoint service while a point-to-multipoint traffic channel is used for transmitting data of the point-to-multipoint service,
    wherein a point-to-multipoint indication channel is used to notify to read the point-to-multipoint control channel, and
    wherein the radio link addition/setup request message comprises a request for including the at least one of point-to-multipoint control channel configuration information and point-to-multipoint indication channel configuration information of the cell in the radio link addition/setup complete message.

2. The method of claim 1, further comprising receiving with the radio link configuration information at least one of point-to-multipoint control channel configuration information and point-to-multipoint indication channel configuration information of at least one neighboring cell of the cell.

3. The method of claim 1 further comprising adding the cell to a list of cells in an active set of a mobile terminal when the radio link is established.

4. The method of claim 1 wherein the point-to-multipoint service is an MBMS service.

5. The method of claim 1, wherein the point-to-multipoint control channel is an MEMS control channel (MCCH) and the point-to-multipoint indication channel is an MBMS indication channel (MICH).

6. The method of claim 1, wherein the at least one of point-to-multipoint control channel configuration information and point-to-multipoint indication channel configuration information is received in at least one of:
    an Active Set Update message;
    a Cell Update Confirm message;
    a Physical Channel Configuration message;
    a Transport Channel Configuration message;
    a Radio Bearer Reconfiguration message;
    a Radio Bearer Setup message;
    a RRC Connection Setup message;
    a Handover To UTRAN message; and
    a Measurement Control message.

7. The method of claim 6, wherein the at least one of the messages is transmitted via dedicated channel.

8. The method of claim 7, wherein the dedicated channel is a dedicated control channel (DCCH).

9. The method of claim 1,wherein the at least one of point-to-multipoint control channel configuration Information and point-to-multipoint indication channel configuration information of the cell is received from a radio network controller (RNC) of the network 10. The method of claim 2, wherein the at least one of point-to-multipoint control channel configuration information and point-to-multipoint indication channel configuration information of at least one neighboring cell of the cell is received from a radio network controller (RNC) of the network.

11. A method for transmitting a point-to-multipoint service to a mobile terminal receiving a dedicated service in a wireless communication system, the method comprising:

transmitting radio link configuration information to the mobile terminal for establishing a radio link between the mobile terminal and a cell to transmit the dedicated service; and transmitting with the radio link configuration information at least one of point-to-multipoint control channel configuration information and point-to-multipoint indication channel configuration information of the cell for transmitting the point-to-multipoint service, sending a radio link addition/setup request message from a serving radio network controller (SRNC) to a drift radio network controller (DRNC) of the cell for requesting the setup of the radio link; and sending a radio link addition/setup complete message from the DRNC to the SRNC for acknowledging the setup of the radio link, wherein a point-to-multipoint control channel is used to transmit control information of the point-to-multipoint service while a point-to-multipoint traffic channel is used for transmitting data of the point-to-multipoint service, wherein a point-to-multipoint indication channel is used to notify to read the point-to-multipoint control channel, and wherein the radio link addition/setup request message comprises a request for including the at least one of point-to-multipoint control channel configuration information and point-to-multipoint indication channel configuration information of the cell in the radio link addition/setup complete message.

12. The method of claim 11, further comprising transmitting with the radio link configuration information at least one of point-to-multipoint control channel configuration information and point-to-multipoint indication channel configuration information of at least one neighboring cell of the cell.

13. The method of claim 12, wherein the at least one of point-to-multipoint control channel configuration information and point-to-multipoint indication channel configuration information of at least one neighboring cell of the cell is transmitted from a serving radio network controller (SRNC).

14. The method of claim 11, further comprising monitoring the addition of the cell to a list of cells in an active set of the mobile terminal when the radio link is established.

15. The method of claim 11, wherein the radio link addition/setup complete message comprises at least one of:
    the at least one of point-to-multipoint control channel configuration information and point-to-multipoint indication channel configuration information of the cell; and
    at least one of point-to-multipoint control channel configuration information and point-to-multipoint indication channel configuration information of at least one neighboring cell of the cell.

16. The method of claim 11 wherein the point-to-multipoint service is an MBMS service.

17. The method of claim 11 wherein the point-to-multipoint control channel is an MBMS control channel (MCCH) and the point-to-multipoint indication channel is an MEMS indication channel (MICH).

18. The method of claim 11 wherein the at least one of point-to-multipoint control channel configuration information and point-to-multipoint indication channel configuration information is transmitted in at least one of:
    an Active Set Update message;
    a Cell Update Confirm message;
    a Physical Channel Configuration message;
    a Transport Channel Configuration message;
    a Radio Bearer Reconfiguration message;
    a Radio Bearer Setup message;
    a RRC Connection Setup message;
    a Handover To UTRAN message; and
    a Measurement Control message.

19. The method of claim 11 wherein the at least one of point-to-multipoint control channel configuration information and point-to-multipoint indication channel configuration information of the cell is transmitted from a serving radio network controller (SRNC).

20. A mobile terminal for receiving a point-to-multipoint service while receiving a dedicated service in a wireless communication system, the mobile terminal comprising:
    means for receiving radio link configuration information from a network for establishing a radio link with a cell to receive the dedicated service; and
    means for receiving with the radio link configuration information at least one of point-to-multipoint control channel configuration information and point-to-multipoint indication channel configuration information of the cell for receiving the point-to-multipoint service;
    means for receiving a radio link addition/setup request message in a drift radio network controller (DRNC) of the cell from a serving radio network controller (SRNC) for requesting the setup of the radio link; and
    means for receiving a radio link addition/setup complete message in the SRNC from the DRNC for acknowledging the setup of the radio link,
    wherein a point-to-multipoint control channel is used to transmit control information of the point-to-multipoint service while a point-to-multipoint traffic channel is used for transmitting data of the point-to-multipoint service,
    wherein a point-to-multipoint indication channel is used to notify to read the point-to-multipoint control channel, and
    wherein the radio link addition/setup request message comprises a request for including the at least one of point-to-multipoint control channel configuration information and point-to-multipoint indication channel configuration information of the cell in the radio link addition/setup complete message.

21. The mobile terminal of claim 20, further comprising means for receiving with the radio link configuration information at least one of point-to-multipoint control channel configuration information and point-to-multipoint indication channel configuration information of at least one neighboring cell of the cell.

22. The mobile terminal of claim 20, further comprising means for adding the cell to a list of cells in an active set of the mobile terminal when the radio link is established.

23. The mobile terminal of claim 21, wherein the at least one of point-to-multipoint control channel configuration information and point-to-multipoint indication channel configuration information of at least one neighboring cell of the cell is received from a radio network controller (RNC) of the network.

24. The mobile terminal of claim 20, wherein the point-to-multipoint service is an MBMS service.

25. The mobile terminal of claim 20, wherein the point-to-multipoint control channel is an MBMS control channel (MOCH) and the point-to-multipoint indication channel is an MBMS indication channel (MICH).

26. The mobile terminal of claim 20, wherein the at least one of point-to-multipoint control channel configuration information and point-to-multipoint indication channel configuration information is received in at least one of:
  an Active Set Update message;
  a Cell Update Confirm message;
  a Physical Channel Configuration message;
  a Transport Channel Configuration message;
  a Radio Bearer Reconfiguration message;
  a Radio Bearer Setup message;
  a RRC Connection Setup message;
  a Handover To UTRAN message; and
  a Measurement Control message.

27. The mobile terminal of claim 20, wherein the at least one of point-to-multipoint control channel configuration information and point-to-multipoint indication channel configuration information of the cell is received from a radio network controller (RNC) of the network.

* * * * *